US007984752B2

(12) United States Patent
Yusa

(10) Patent No.: US 7,984,752 B2
(45) Date of Patent: Jul. 26, 2011

(54) DOUBLE-PIPE HEAT EXCHANGER AND MANUFACTURING METHOD THEREOF

(75) Inventor: Kazuhiko Yusa, Nagoya (JP)

(73) Assignee: T. Rad Co., Ltd., Tokyo (JP)

( * ) Notice: Subject to any disclaimer, the term of this patent is extended or adjusted under 35 U.S.C. 154(b) by 1342 days.

(21) Appl. No.: 10/592,840

(22) PCT Filed: Jan. 21, 2005

(86) PCT No.: PCT/JP2005/001178

§ 371 (c)(1), (2), (4) Date: Sep. 15, 2006

(87) PCT Pub. No.: WO2005/090890

PCT Pub. Date: Sep. 29, 2005

(65) Prior Publication Data

US 2008/0251241 A1 Oct. 16, 2008

(30) Foreign Application Priority Data

Mar. 17, 2004 (JP) ................................ 2004-076955

(51) Int. Cl.

| | |
|---|---|
| ***F28D 7/10*** | (2006.01) |
| ***F28D 7/00*** | (2006.01) |
| ***B60H 3/00*** | (2006.01) |
| ***F02M 31/08*** | (2006.01) |
| ***F28F 9/22*** | (2006.01) |

(52) U.S. Cl. ........ 165/154; 165/159; 165/141; 165/155; 165/42; 165/52; 165/160

(58) Field of Classification Search .................. 165/154, 165/159, 141, 155, 160, 42, 52
See application file for complete search history.

(56) References Cited

U.S. PATENT DOCUMENTS

| | | | | |
|---|---|---|---|---|
| 1,787,904 | A * | 1/1931 | Heyward | 165/154 |
| 2,259,433 | A * | 10/1941 | Kitto | 165/154 |
| 5,311,661 | A * | 5/1994 | Zifferer | 29/890.053 |

FOREIGN PATENT DOCUMENTS

| | | |
|---|---|---|
| JP | 52-124346 | 9/1977 |
| JP | 54-3658 | 1/1979 |
| JP | 2000-161871 | 6/2000 |
| JP | 2002-13882 | 1/2002 |

* cited by examiner

*Primary Examiner* — Ljiljana (Lil) V Ciric
*Assistant Examiner* — Travis Ruby
(74) *Attorney, Agent, or Firm* — Jordan and Hamburg LLP

(57) ABSTRACT

A double-tube heat exchanger that is easy to produce, the entire part of which is smoothly bent so that the heat exchanger works as a part of piping, and that has high pressure resistance. In the cross-section perpendicular to the axis of an inner tube (1), there are bag-like or ballon-like bulged sections (7*a*) directing radially from the center, and openings of the bulged sections (7*a*) are closed and the head of each bulged section (7*a*) is in contact with the inner surface of an outer tube (2).

5 Claims, 3 Drawing Sheets

DOUBLE-PIPE HEAT EXCHANGER AND MANUFACTURING METHOD THEREOF

BACKGROUND OF THE INVENTION

The present invention relates to a double-pipe heat exchanger for use as an EGR cooler, an oil cooler, or the like, the double-pipe heat exchanger being capable of smoothly bending along a pipeline of vehicles.

An EGR cooler is interposed on the way of piping of exhaust gas of an engine, and acts to cool the exhaust gas using cooling water. This EGR cooler is exemplified as below by a double-pipe heat exchanger disclosed in Japanese Patent Application Laid-open No. 2000-161871.

This double-pipe heat exchanger is in a double-pipe structure with an inner tube and an outer tube, in which structure a radiator fin is integrally formed by bending at the intermediate portion in an axial direction of the inner tube. That is, the inner tube has at the intermediate portion a multiple number of protrusions formed in a radial direction from the center in section thereof.

Conventionally, an EGR cooler is interposed at the linear portion on the way of piping for exhaust gas of an engine. Therefore, there have been such problems that the EGR cooler lacks flexibility in a position to be disposed, and the number of parts for connection thereof, for example, becomes big, thus inevitably resulting in higher manufacturing costs as a whole.

Accordingly, an object of the present invention is to provide a double-pipe heat exchanger in simple structure capable of being easily bent conforming with a pipeline, and a manufacturing method thereof.

SUMMARY OF THE INVENTION

A first aspect of the present invention is a double-pipe heat exchanger in which an outer tube (2) is fitted over an outer circumference of an inner tube (1), and a space between both end portions of both tubes (1) and (2) is closed, and inlet/outlet (4) of a first fluid (3) are opened in the outer circumference at both end portions of the outer tube (2) to provide a first flow path (5) in which the first fluid (3) flows in an axial direction thereof between the outer circumferential side of the inner tube (1) and the inner circumferential side of the outer tube (2), and to provide a second flow path (7) in which a second fluid (6) flows on the inner circumferential side of the inner tube (1), wherein the inner tube (1) is so constructed that two or more swollen portions (7*a*) having a bladder-like shape in section protruded in a radial direction from the center are formed along an axis line, and each bladder-like shape portion has a section, a mouth of which is closed.

A second aspect of the present invention is the double-pipe heat exchanger according to the first aspect of the present invention, wherein the inner tube (1) is formed in a circular shape in section at both end portions thereof, and the both end portions are connected to the outer tube (2), and wherein the two or more swollen portions (7*a*) are formed into a wave shape along an axial direction at the tip end portions, and top portions (8) of the waves are in contact with an inner circumference of the outer tube (2).

Another aspect of the present invention is the double-pipe heat exchanger according to the first or second aspect of the present invention, wherein the two or more swollen portions (7*a*) are formed at equal intervals in a circumferential direction of the inner tube (1).

A fourth aspect of the present invention is a manufacturing method of the double-pipe heat exchanger according to any of the first to third aspects of the present invention, wherein both tubes are applied with an external force in a state the outer tube (2) is fitted over the outer circumference of the inner tube (1), so that axis lines thereof are bent to deform plastically.

A fifth aspect of the present invention is the manufacturing method of the double-pipe heat exchanger according to the fourth aspect of the present invention, wherein there is provided in the inner tube (1) an even number of four or more swollen portions (7*a*) uniformly in a circumferential direction, and both tubes are applied with an external force to be deformed by bending in a direction of a diameter line L as a center of curvature, where there is no bladder-like shape in section.

The double-pipe heat exchanger and the manufacturing method thereof according to the present invention have such structure and arrangement as described above, and provide the following advantages.

In the double-pipe heat exchanger according to the present invention, an inner tube 1 thereof is so constructed that two or more swollen portions 7*a* in a bladder-like shape in section protruded in a radial direction from the center are formed along an axis line, and each bladder-like shape portion has a section, a mouth of which is closed.

As a result, particularly with respect to the first fluid 3 flowing between the inner tube 1 and the outer tube 2, high pressure resistance is achieved. That is, even if the first flow path 5 is applied with a large internal pressure, the inner tube 1 is never deformed.

In the above-mentioned construction, respective swollen portions 7*a* are bent in a wave shape along an axial direction at the tip end portions, and thus a top portion 8 of these waves can be in contact with the inner circumference of the outer tube 2. In this case, the first fluid 3 and the second fluid 6 are stirred, thus enabling to enhance heat exchange performance, and since the top portions 8 of the inner tube 1 and the inner circumference of the outer tube 2 are in contact, a heat exchanger having high strength as well as high pressure resistance may be achieved.

In the above-mentioned construction, two or more swollen portions 7*a* may be formed at equal intervals in a circumferential direction of the inner tube 1. Thus, it is possible to cause the first fluid 3 and the second fluid 6 to flow uniformly, as well as to achieve higher-pressure resistance.

In the manufacturing method of the double-pipe heat exchanger of the above-mentioned construction, in a state that the outer tube 2 is fitted over the outer circumference of the inner tube 1, both tubes can be applied with an external force so that axis lines thereof are bent to deform plastically. The inner tube 1 includes two or more swollen portions 7*a* protruded in a radial direction form center, these swollen portions 7*a* being constructed that mouths of bladder-like shapes in section thereof are closed, whereby it is possible to perform an extremely smooth bending of the inner tube 1. That is, there is no fear of the occurrence of deformation such as buckling of the inner tube 1 in the process of bending. In particular, in the case that the outer circumference of the inner tube 1 and the inner circumference of the outer tube 2 are in contact with each other, buckling of both the inner tube 1 and the outer tube 2 does not occur, thus enabling to make forming by bending smoothly.

In the above-mentioned construction, there is provided in the inner tube 1 an even number of four or more swollen portions 7*a* uniformly disposed in a circumferential direction, an external force is applied, and both tubes can be deformed by bending with a diameter line L where there is no bladder-like shape in section as a center of curvature. As a result, it is possible to make forming of the inner tube 1 and the outer tube 2 by bending more smoothly.

DETAILED DESCRIPTION OF THE INVENTION

Figure 1:
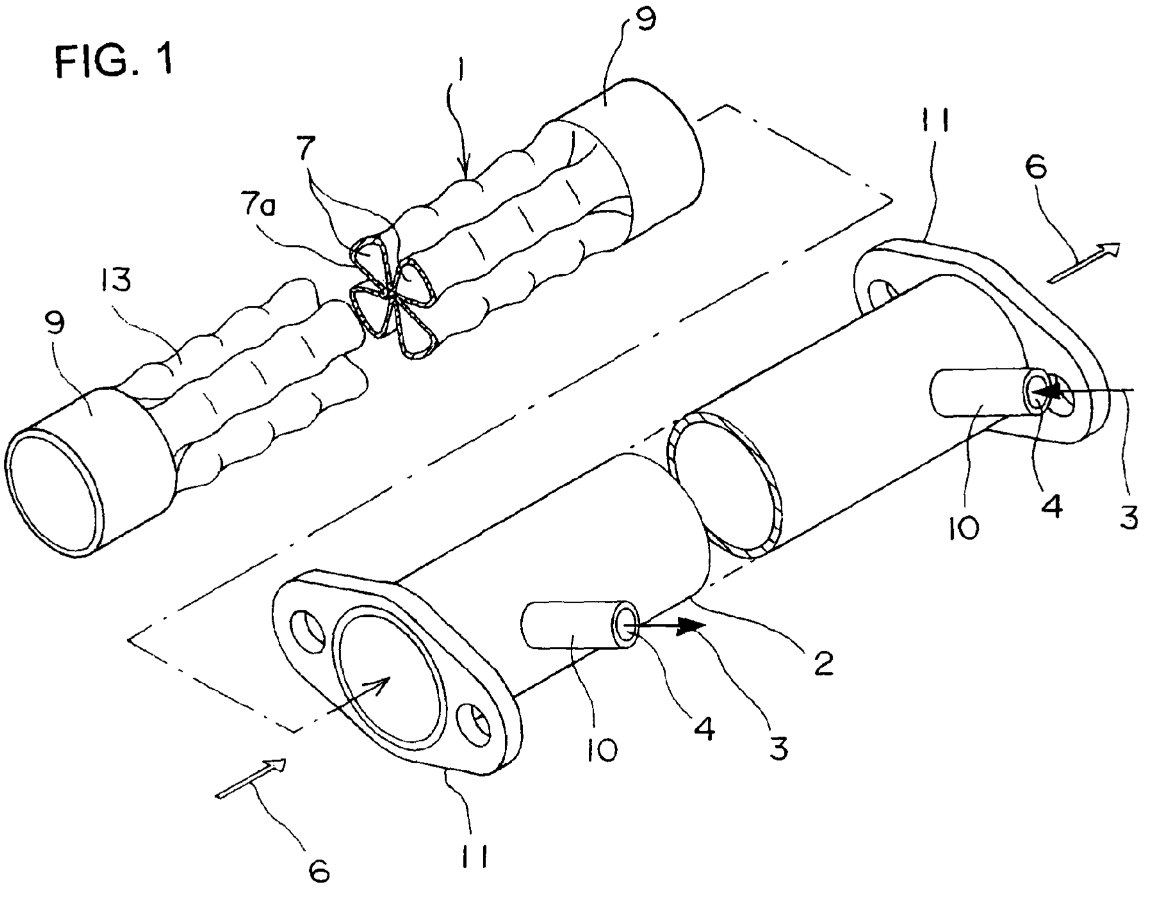
FIG. 1 shows an exploded perspective view of a double-pipe heat exchanger according to the present invention.

Now, an embodiment according to the present invention is described referring to the drawings.

Figure 2:
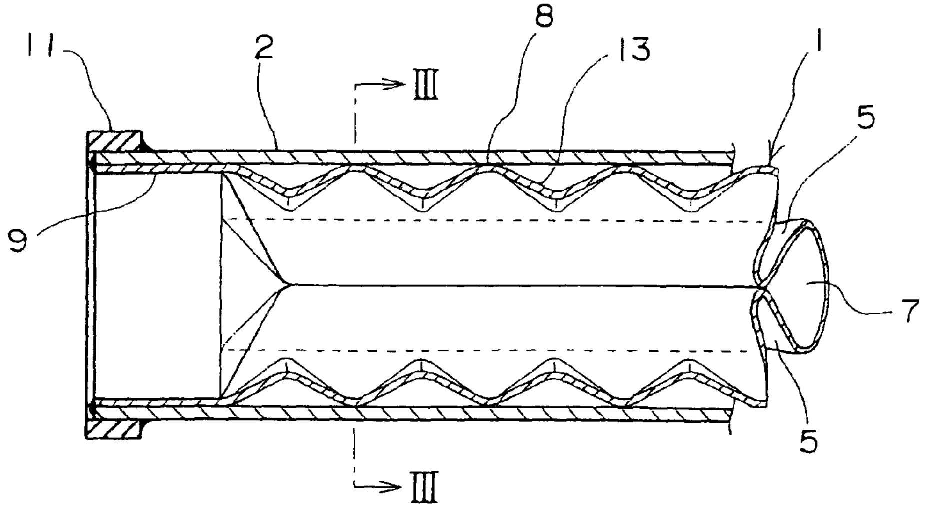
FIG. 2 shows a longitudinally sectional view of a relevant portion illustrating an assembly state of the same heat exchanger.
Figure 3:
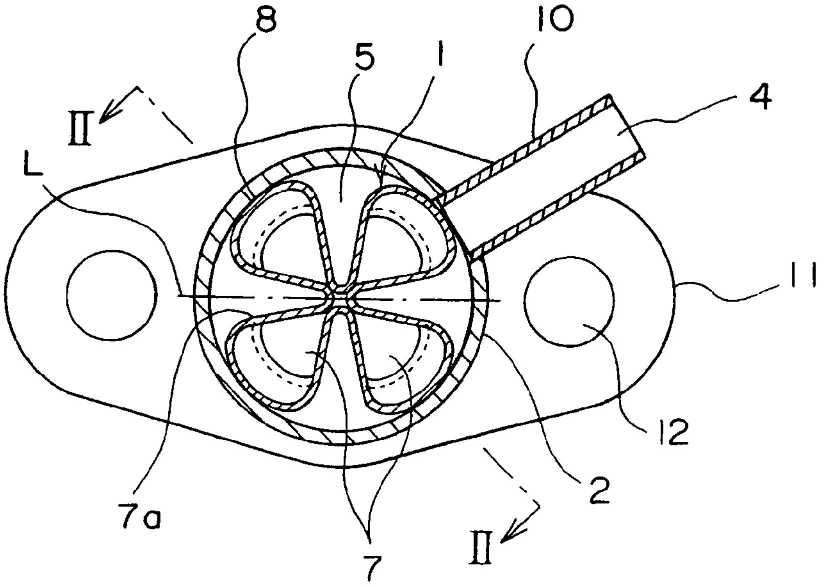
FIG. 3 shows a sectional view taken along a line III-III in FIG. 2.
Figure 7:
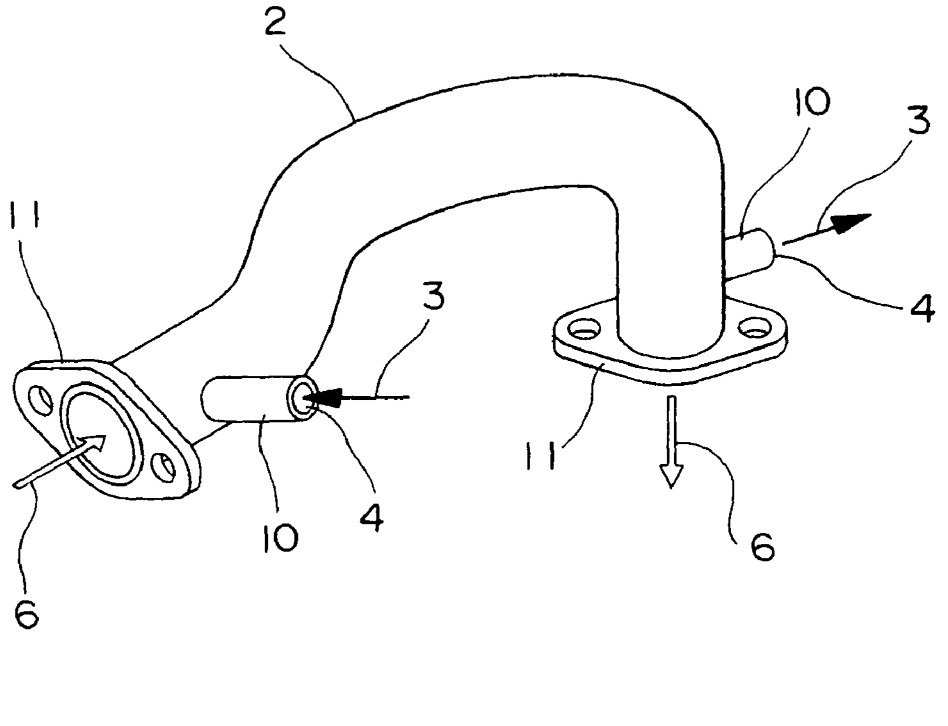
FIG. 7 shows a perspective view illustrating the state in which the double-pipe heat exchanger according to the present invention is bent.

FIG. 1 shows an exploded perspective view of a double-pipe heat exchanger according to the present invention; FIG. 2 shows a longitudinally sectional view of a relevant portion illustrating an assembly state thereof; and FIG. 3 shows a sectional view taken along a line III-III in FIG. 2. Further, FIG. 7 shows a perspective view illustrating the state in which the same double-pipe heat exchanger is bent.

This heat exchanger includes an outer tube 2 and an inner tube 1 inserted in an internal part of the outer tube 2. The inner tube 1, as shown in FIG. 1, except for both end portions, is so constructed that is shaped by bending into a four-leaf clover-like shape in section; as well as that each of swollen portions 7*a* in a clover-like shape is bent in a wave shape in an axial direction thereof. Moreover, the maximum radius of a top portion 8 of these waves is equal to a radius of an inner circumference of the outer tube 2. In addition, each swollen portion 7*a* corresponding to each leaf of a four-leaf clover-like shape in section thereof is formed in a bladder-like shape in section, and a mouth of this bladder-like shape in section is formed to be closed as shown in FIG. 3. Both end portions 9 of the inner tube 1 are formed in a tubular shape, and an outer circumferential diameter thereof is equal to an inner circumferential diameter of the outer tube 2. The inner tube 1 as shown in FIG. 1 can be easily shaped with such tubular end portions 9 manufactured, for example, by forming the whole inner tube 1 in a four-leaf clover-like shape in section along the length thereof, and thereafter expanding only these end portions 9 to form a tubular shape.

Note that the swollen portions 7*a*, as obvious in FIG. 3, are formed in swollen bladders or balloon-like shapes in section respectively, and are disposed at equal intervals in a circumferential direction. Each swollen portion 7*a* comes to be wider by degrees outwardly in a radial direction from the center. Further, these swollen portions 7*a* may be formed into a variety of shapes. For example, the swollen portion 7*a* may be formed to be wider by degrees up to the intermediate portion outwardly in a radial direction from the center, and then to be narrower by degrees toward the tip end. Moreover, although the swollen portion 7*a*, as shown in FIG. 2, is formed in a wave shape in a longitudinal section parallel to an axis line thereof, an amplitude and phase of these waves may be set as appropriate.

The outer tube 2 in this example, as obvious in FIG. 1, is provided with a pair of flanges 11 fixed thereto by welding at both ends thereof, with a pair of inlet/outlet 4 at both end portions in the axial direction, and with inlet/outlet pipes 10 protruding therefrom. The inner tube 1 and the outer tube 2 are thus constructed, and the inner tube 1 is inserted into the outer tube 2 in the state that axis lines thereof are made linear. Subsequently, only open edge at the end of the inner tube 1 is fixed by welding to the open end of the outer tube 2 as shown in FIG. 2. At this time, the top portions 8 of the inner tube 1 are in contact with the inner surface of the outer tube 2. The top portions 8 are in the state of non-joint to the inner surface of the outer tube 2, the reason of which is to make bending easy when the whole is bent as shown in FIG. 7.

Now, the manufacturing method of a heat exchanger which is bent as shown in FIG. 7 is described, after the heat exchanger as shown in FIG. 2 has been manufactured. The inner tube 1 and the outer tube 2 are bent by an external force applied to the whole in a state that the inner tube 1 is fixed to the outer tube 2 at the both ends thereof. In that occasion, the tubes are bent around the diameter line L shown in FIG. 3, preferably. That is, the tubes are bent around the diameter line L at the intermediate point between the adjacent swollen portions 7*a* where there is no swollen portion 7*a*. Note that, although a diameter line L is shown on the horizontal line in FIG. 3, it may be on a vertical line orthogonal thereto, and the tubes may be bent around the vertical line. Due to the fact that the tubes are thus bent around a position of no swollen portion, the inner tube 1 and the outer tube 2 can be deformed easily by bending by the external force applied, and buckling or the like is unlikely to occur at the swollen portions 7*a*.

Note that the tubes are bent in the state that the top portions 8 of the swollen portions 7*a* are in contact with the inner surface of the outer tube 2, and consequently the outer tube 2 is never buckled in the process of bending. Thus, as an example, the whole is bent as shown in FIG. 7. This bending is made so as to conform with a construction path of piping. The double-pipe heat exchanger thus formed is connected via the flanges 11 as a part of piping for taking out exhaust gas of an engine. Then, cooling water flows in as first fluid 3 through one of a pair of inlet/outlet pipes 10, flows between the inner tube 1 and the outer tube 2, and flows out through the other inlet/outlet pipe 10. Furthermore, exhaust gas flows as second fluid 6 inside the inner tube 1, and this exhaust gas is cooled with the cooling water. The exhaust gas flows in rolling manner in each of the swollen portions 7*a* in which the exhaust gas is comparatively easy to flow. Likewise, the cooling water also flows in rolling manner on the outer surface side of the inner tube 1. Moreover, the cooling water flows along the groove-shaped portions resided between respective swollen portions 7*a*.

Although the above-mentioned embodiment is described as an EGR cooler, alternatively this double-pipe heat exchanger may be utilized as oil cooler as well. In this case, oil may be made to flow between the inner tube 1 and the outer tube 2, and cooling water may be made to flow in an internal part of the inner tube 1. As an alternative, cooling water may be made to flow between the inner tube 1 and the outer tube 2, and oil may be made to flow in an internal part of the inner tube 1.

Figure 4:
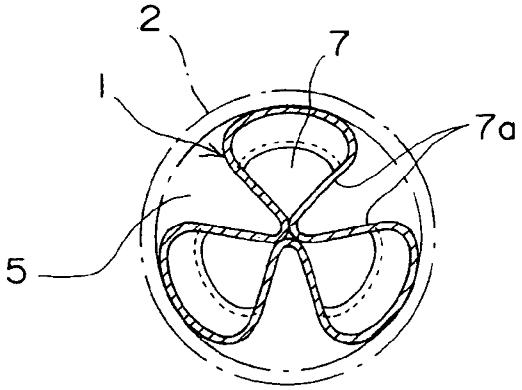
FIG. 4 shows a laterally sectional view of a relevant portion illustrating another embodiment of a double-pipe heat exchanger according to the present invention.

Now, FIG. 4 shows a second embodiment according to the present invention, and this second embodiment is different from the first embodiment mentioned only in that an inner tube 1 thereof is formed to be in a three-leaf clover-like shape in section. Mouths of the bladder-like shapes in section of respective swollen portions 7*a* are closed as in the first embodiment.

Figure 5:
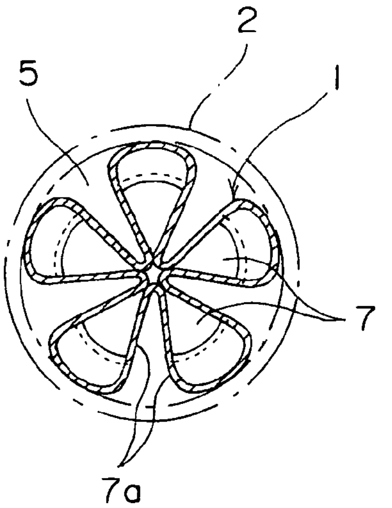
FIG. 5 shows a laterally sectional view of a relevant portion illustrating further another embodiment.

Next, FIG. 5 shows a laterally sectional view of an inner tube 1 illustrating a third embodiment of a heat exchanger according to the present invention, and this example includes five swollen portions 7*a* formed at equal intervals in the radial direction. Also in this example, mouths of the bladder-like shapes in section of respective swollen portions 7*a* are closed.

Figure 6:
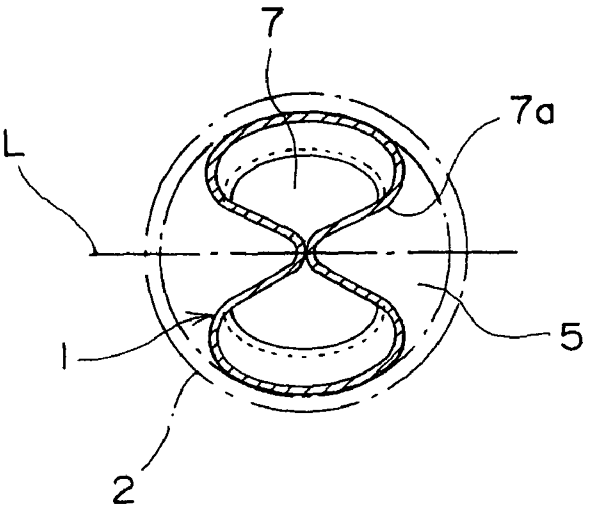
FIG. 6 shows a laterally sectional view of a relevant portion further illustrating an embodiment of the same heat exchanger.

In the next, FIG. 6 shows a laterally sectional view of an inner tube 1 illustrating a fourth embodiment according to the present invention, and this example includes two swollen portions 7*a* protruded in a diameter direction of an outer tube 2. Also in this example, mouths of the bladder-like shapes in section of respective swollen portions 7*a* are closed.

The invention claimed is:

1. A double-pipe heat exchanger in which an outer tube is fitted over an outer circumference of an inner tube, a space between both end portions of both tubes is closed, a first inlet/outlet of a first fluid are opened in the outer circumference at both end portions of the outer tube to provide a first flow path in which said first fluid flows in an axial direction thereof between the outer circumferential side of the inner tube and the inner circumferential side of the outer tube, and a second inlet/outlet provides a second flow path in which a second fluid flows on the inner circumferential side of the inner tube, wherein said inner tube is so constructed that three or more swollen portions in a bladder-like shape in section protruded in a radial direction from the center are formed at equal intervals in a circumferential direction of the inner tube along an axis line, and each bladder-like shape portion has a closed mouth portion section toward the axis line preventing fluid from flowing through the mouth portion into an adjacent bladder-like shape portion, each of said three or more swollen portions having a distal portion away from the mouth portion, the distal portions of the swollen portions defining a wave shape along an axial direction with top portions of the waves being in contact with the inner circumferential side of the outer tube;

wherein said inner tube is formed in a circular shape in section at both end portions thereof, with both end portions being connected to the outer tube;

wherein both tubes are applied with an external force in a state that the outer tube is fitted over the outer circumference of the inner tube so that axis lines thereof are bent to deform plastically; and wherein said top portions of the wave in said swollen portions of the inner tube that are in contact with the outer tube are not fixed to said outer tube allowing relative movement between said outer tube and inner tube in an area of said contact during bending of said heat exchanger.

2. A method of manufacturing a double-pipe heat exchanger in which an outer tube is fitted over an outer circumference of an inner tube, a space between both end portions of both tubes is closed, a first inlet/outlet of a first fluid are opened in the outer circumference at both end portions of the outer tube to provide a first flow path in which said first fluid flows in an axial direction thereof between the outer circumferential side of the inner tube and the inner circumferential side of the outer tube, and a second inlet/outlet provides a second flow path in which a second fluid flows on the inner circumferential side of the inner tube, wherein said inner tube is so constructed that three or more swollen portions in a bladder-like shape in section protruded in a radial direction from the center are formed at equal intervals in a circumferential direction of the inner tube along an axis line, and each bladder-like shape portion has a closed mouth portion section toward the axis line preventing fluid from flowing through the mouth portion into an adjacent bladder-like shape portion, each of said three or more swollen portions having a distal portion away from the mouth portion, the distal portions of the swollen portions defining a wave shape along an axial direction with top portions of the waves being in contact with the inner circumferential side of the outer tube;

wherein said inner tube is formed in a circular shape in section at both end portions thereof, with both end portions being connected to the outer tube;

wherein both tubes are applied with an external force in a state that the outer tube is fitted over the outer circumference of the inner tube so that axis lines thereof are bent to deform plastically;

wherein said top portions of the wave in said swollen portions of the inner tube that are in contact with the outer tube are not fixed to said outer tube allowing relative movement between said outer tube and inner tube in an area of said contact during bending of said heat exchanger, and wherein there is provided in said inner tube an even number of four or more said swollen portions uniformly in a circumferential direction, and both tubes are applied with an external force to be deformed by bending in a direction of a diameter line L as a center of curvature, where there is no bladder-like shape in section, wherein said inner tube inner tube is not fixed to said outer tube in the region of bending allowing relative movement between the outer tube and inner tube in the region of said bending.

3. A method of manufacturing a double-pipe heat exchanger in which an outer tube is fitted over an outer circumference of an inner tube, a space between both end portions of both tubes is closed, a first inlet/outlet of a first fluid are opened in the outer circumference at both end portions of the outer tube to provide a first flow path in which said first fluid flows in an axial direction thereof between the outer circumferential side of the inner tube and the inner circumferential side of the outer tube, and a second inlet/outlet provides a second flow path in which a second fluid flows on the inner circumferential side of the inner tube, wherein said inner tube is so constructed that three or more swollen portions in a bladder-like shape in section protruded in a radial direction from the center are formed at equal intervals in a circumferential direction of the inner tube along an axis line, and each bladder-like shape portion has a closed mouth portion section toward the axis line preventing fluid from flowing through the mouth portion into an adjacent bladder-like shape portion, each of said three or more swollen portions having a distal portion away from the mouth portion, the distal portions of the swollen portions defining a wave shape along an axial direction with top portions of the waves being in contact with the inner circumferential side of the outer tube;

wherein said inner tube is formed in a circular shape in section at both end portions thereof, with both end portions being connected to the outer tube;

wherein both tubes are applied with an external force in a state that the outer tube is fitted over the outer circumference of the inner tube so that axis lines thereof are bent to deform plastically; and wherein said top portions of the wave in said swollen portions of the inner tube that are in contact with the outer tube are not fixed to said outer tube allowing relative movement between said outer tube and inner tube in an area of said contact during bending of said heat exchanger;

the method comprising:

applying an external force to both said inner tube and said outer tube to deform the heat exchanger by bending in a direction of a diameter line L as a center of curvature;

said force applied to cause bending in a region where there are no top portions of the waves of the inner tube in contact with the outer tube;

said outer tube being free to move relative to an adjacent portion of the inner tube in the region of bending during said bending; and said outer tube bending without buckling to conform to a construction path of said heat exchanger during said applying of the external force.

4. A double-pipe heat exchanger comprising an outer tube fitted over an outer circumference of an inner tube;

the inner tube having three or more swollen portions, each one swollen portion having a bladder-like shape in section protruding in a radial direction from an axis line of the inner tube with a closed mouth portion located toward the axis line and a distal portion located away from said axis line, said swollen portions being located at equal intervals in a circumferential direction of the inner tube along the axis line, said inner tube having a wave shape defined by the distal portions of the swollen portion sections, wherein peaks of the wave shape contact an inner circumferential side of the outer tube;

wherein said inner tube is formed in a circular shape in section at first and second end portions thereof, with said first and second end portions being connected respectively to corresponding first and second end portions of the outer tube, said connection at the first end portions of the inner and outer tube being closed to fluid flow between said inner and outer tubes, said connection at the second end portions of the inner and outer tube being closed to fluid flow between said inner and outer tubes;

said inner tube and outer tube bent to conform to a construction path wherein said outer tube is deformed without buckling in a region of bend and wherein peaks of the wave shape non-fixedly contact the inner circumferential side of the outer tube allowing relative movement between said outer tube and inner tube in an area of said contact closest to said region of bend during bending of said heat exchanger; and said outer tube having an inlet and an outlet to provide a first flow path in which said first fluid flows in an axial direction between the outer circumferential side of the inner tube and the inner circumferential side of the outer tube;

said inner tube having an inlet and an outlet to provide a second flow path along which a second fluid flows within the inner tube.

5. A method of manufacturing a double-pipe heat exchanger, the double-pipe heat exchanger comprising an outer tube fitted over an outer circumference of an inner tube;

the inner tube having three or more swollen portions, each one swollen portion having a bladder-like shape in section protruding in a radial direction from an axis line of the inner tube with a closed mouth portion located toward the axis line and a distal portion located away from said axis line, said swollen portions being located at equal intervals in a circumferential direction of the inner tube along the axis line, said inner tube having a wave shape defined by the distal portions of the swollen portion sections, wherein peaks of the wave shape contact an inner circumferential side of the outer tube;

wherein said inner tube is formed in a circular shape in section at first and second end portions thereof, with said first and second end portions being connected respectively to corresponding first and second end portions of the outer tube, said connection at the first end portions of the inner and outer tube being closed to fluid flow between said inner and outer tubes, said connection at the second end portions of the inner and outer tube being closed to fluid flow between said inner and outer tubes;

said inner tube and outer tube bent to conform to a construction path wherein said outer tube is deformed without buckling in a region of bend and wherein peaks of the wave shape non-fixedly contact the inner circumferential side of the outer tube allowing relative movement between said outer tube and inner tube in an area of said contact closest to said region of bend during bending of said heat exchanger; and said outer tube having an inlet and an outlet to provide a first flow path in which said first fluid flows in an axial direction between the outer circumferential side of the inner tube and the inner circumferential side of the outer tube;

said inner tube having an inlet and an outlet to provide a second flow path along which a second fluid flows within the inner tube;

the method comprising:

applying an external force to both said inner tube and said outer tube to deform the heat exchanger by bending in a direction of a diameter line L as a center of curvature;

said force applied to cause bending in a region where there are no top portions of the waves of the inner tube in contact with the outer tube;

said outer tube being free to move relative to an adjacent portion of the inner tube in the region of bending during said bending; and said outer tube bending, without buckling, to conform to a construction path of said heat exchanger during said applying of the external force.

* * * * *